US010322454B2

(12) United States Patent
Guo et al.

(10) Patent No.: US 10,322,454 B2
(45) Date of Patent: Jun. 18, 2019

(54) METHOD FOR MANUFACTURING HIGH MELTING POINT METAL BASED OBJECTS

(71) Applicant: General Electric Company, Schenectady, NY (US)

(72) Inventors: Rui Guo, Shanghai (CN); Zhixue Peng, Shanghai (CN); Yanmin Li, Shanghai (CN); Wen Tan, Shanghai (CN); Abdelaziz Ikhlef, Hartland, WI (US)

(73) Assignee: General Electric Company, Schenectady, NY (US)

( * ) Notice: Subject to any disclaimer, the term of this patent is extended or adjusted under 35 U.S.C. 154(b) by 761 days.

(21) Appl. No.: 14/221,026

(22) Filed: Mar. 20, 2014

(65) Prior Publication Data

US 2014/0286813 A1    Sep. 25, 2014

(30) Foreign Application Priority Data

Mar. 22, 2013  (CN) .......................... 2013 1 0092969

(51) Int. Cl.
*B22F 3/105*  (2006.01)
*B33Y 10/00*  (2015.01)
(Continued)

(52) U.S. Cl.
CPC ............ *B22F 3/1055* (2013.01); *B33Y 10/00* (2014.12); *B22F 3/26* (2013.01); *B22F 5/10* (2013.01);
(Continued)

(58) Field of Classification Search
CPC ....... C22C 1/05; B29C 67/00; B29C 67/0077; B22F 3/1055; B22F 3/105; B22F 3/11;
(Continued)

(56) References Cited

U.S. PATENT DOCUMENTS 4,179,100 A * 12/1979 Sashin ..................... A61B 6/02
250/366
4,440,573 A    4/1984 Ishizuka
(Continued)

FOREIGN PATENT DOCUMENTS

JP    5437005 A    3/1979
JP    563601 A    1/1981
(Continued)

OTHER PUBLICATIONS

Atkinson, H. V., and S. Davies. "Fundamental aspects of hot isostatic pressing: an overview." Metallurgical and Materials Transactions A 31.12 (2000): 2981-3000.*
(Continued)

*Primary Examiner* — Alexandra M Moore
(74) *Attorney, Agent, or Firm* — McCoy Russell LLP

(57) ABSTRACT

A method for manufacturing a high melting point metal based object includes providing pure high melting point metal based powder, fabricating a green object from the powder, by way of a laser sintering technique, providing infiltration treatment to the green object, and providing heating pressure treatment to the green object. The temperature to the green object is controlled to the re-sintering point of the green object.

9 Claims, 9 Drawing Sheets

(51) Int. Cl.
*B22F 5/10* (2006.01)
*B33Y 80/00* (2015.01)
*B22F 3/26* (2006.01)
*G21K 1/02* (2006.01)

(52) U.S. Cl.
CPC ....... *B22F 2203/11* (2013.01); *B22F 2301/20* (2013.01); *B22F 2304/10* (2013.01); *B22F 2998/10* (2013.01); *B33Y 80/00* (2014.12); *G21K 1/025* (2013.01); *Y02P 10/295* (2015.11)

(58) Field of Classification Search
CPC ...... B22F 3/16; B22F 5/00; B22F 7/00; B22F 2203/11; B22F 2304/10; B22F 2301/20; B23K 26/34; B23K 15/00; B23K 15/10; B33Y 10/00; B33Y 80/00
USPC .......................................................... 264/497
See application file for complete search history.

(56) References Cited

U.S. PATENT DOCUMENTS

| | | | | |
|---|---|---|---|---|
| 4,554,218 A * | 11/1985 | Gardner | ............... | B22F 1/0003 419/23 |
| 4,863,538 A * | 9/1989 | Deckard | ............... | B33Y 10/00 156/272.8 |
| 5,017,753 A * | 5/1991 | Deckard | ............... | B23K 26/082 219/121.63 |
| 5,126,102 A * | 6/1992 | Takahashi | ............... | B22F 3/26 419/2 |
| 5,147,587 A | 9/1992 | Marcus et al. | | |
| 5,303,282 A * | 4/1994 | Kwasnick | ............... | G21K 1/02 378/147 |
| 5,745,834 A * | 4/1998 | Bampton | ............... | B22F 3/10 419/37 |
| 5,949,850 A * | 9/1999 | Tang | ............... | G03F 7/0007 378/145 |
| 6,363,136 B1 * | 3/2002 | Flisikowski | ............... | G21K 1/025 378/147 |
| 6,399,018 B1 * | 6/2002 | German | ............... | B22F 3/22 164/61 |
| 6,461,881 B1 * | 10/2002 | Farnworth | ............... | G03F 7/70416 257/E21.511 |
| 6,814,926 B2 | 11/2004 | Geving et al. | | |
| 6,951,628 B2 * | 10/2005 | Eidam | ............... | G21K 1/025 264/221 |
| 7,540,996 B2 * | 6/2009 | Bampton | ............... | B22F 1/0003 419/53 |
| 7,615,161 B2 | 11/2009 | Hoffman | | |
| 2002/0012607 A1 | 1/2002 | Corbin et al. | | |
| 2006/0055087 A1 * | 3/2006 | Freund | ............... | G21K 1/025 264/401 |
| 2010/0158195 A1 | 6/2010 | Wirth | | |
| 2011/0019801 A1 | 1/2011 | Eichenseer et al. | | |
| 2012/0132833 A1 | 5/2012 | Freund et al. | | |
| 2012/0132834 A1 | 5/2012 | Freund et al. | | |
| 2012/0163553 A1 * | 6/2012 | Deych | ............... | G21K 1/025 378/154 |

FOREIGN PATENT DOCUMENTS

| | | |
|---|---|---|
| JP | 61276798 A | 12/1986 |
| JP | 2012140683 A | 7/2012 |
| KR | 890000180 B1 | 3/1989 |
| WO | 9530503 A1 | 11/1995 |
| WO | 2013018957 A1 | 2/2013 |

OTHER PUBLICATIONS

CPCPress Interactive Periodic Table "Tungsten" Synopsis Non-Patent Literature.*
Agarwala, "Structurally Sound Metal Parts by Selective Laser Sintering", OneMine—EPD Congress, pp. 833-851, Jan. 1, 1994.
Zhong et al., "Laser Direct Manufacturing of Tungsten Nickel Collimation Component", Journal of Materials Processing Technology, vol. No. 147, Issue No. 2, pp. 167-173, Apr. 10, 2004.
Unofficial English Translation of Chinese Office Action issued in connection with corresponding CN Application No. 201310092969.1 dated Oct. 10, 2015.

* cited by examiner

METHOD FOR MANUFACTURING HIGH MELTING POINT METAL BASED OBJECTS

BACKGROUND

Embodiments of the invention relate generally to a manufacturing method, which is used to manufacture high melting point metal based objects. Here, the "high melting point metal" related to a kind of metal whose melting point is higher than 2500 degrees Celsius, such as molybdenum, tungsten, tantalum, or their alloys.

Three-dimensional (3D) objects such as collimators used in x-ray imaging devices can be manufactured by using laser rapid manufacturing technology. One laser rapid manufacturing approach uses a laser beam to scan across and selectively sinter/melt metal powder to build up a prototype layer-by-layer from a predetermined model of the 3D object. Laser sintering/melting is a process in which the temperature of a powdered material is raised to its melting/softening point by thermal heating with a laser beam, thereby causing the particles of the powder to fuse together in the heated region.

However, if the melting point of the powdered material is very high, such as tungsten (about 3410 degrees Celsius), it may not melt the powdered material completely through the normal laser. To solve this problem, one conventional method may use a high power laser to manufacture the 3D objects. But, the high power laser will require significant energy input during the manufacturing process which may increase the costs.

Another conventional method may use low melting point binders, for example including nonmetallic binders such as nylon and silicate and metallic binders such as iron and nickel, to add into the high melting point metal or alloys to improve the forming capability for manufacturing. For example, nickel is used as a binder for tungsten to manufacture collimators through laser cladding. However, when the nickel content in the powder mixture is low (for example, lower than 50 vol %), the powder mixture also has a poor forming capability. When the nickel content in the powder mixture is high (for example, higher than 50 vol %) to ensure forming capability for manufacturing by laser cladding, the collimator may be deficient in its absorbing capability.

For these and other reasons, there is a need for manufacturing 3D objects which are made of high melting point metal without binders or only with low proportion of binders.

BRIEF DESCRIPTION

In accordance with an embodiment of the invention, a method for manufacturing a high melting point metal based object is provided. The method includes: providing pure high melting point metal based powder; fabricating a green object from the powder, by way of a laser sintering technique; providing infiltration treatment to the green object; and providing heating pressure treatment to the green object. The temperature to the green object is controlled to the re-sintering point of the green object.

In accordance with another embodiment of the invention, a method for manufacturing a high melting point metal based object is provided. The method includes: providing powder mixture comprising high melting point metal and balanced with low melting point metal binder; fabricating a green object from the powder mixture, by way of a laser sintering technique; and providing heating pressure treatment to the green object. The high melting point metal is greater than 50 vol %. The temperature to the green object is controlled to the re-sintering point of the green object.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
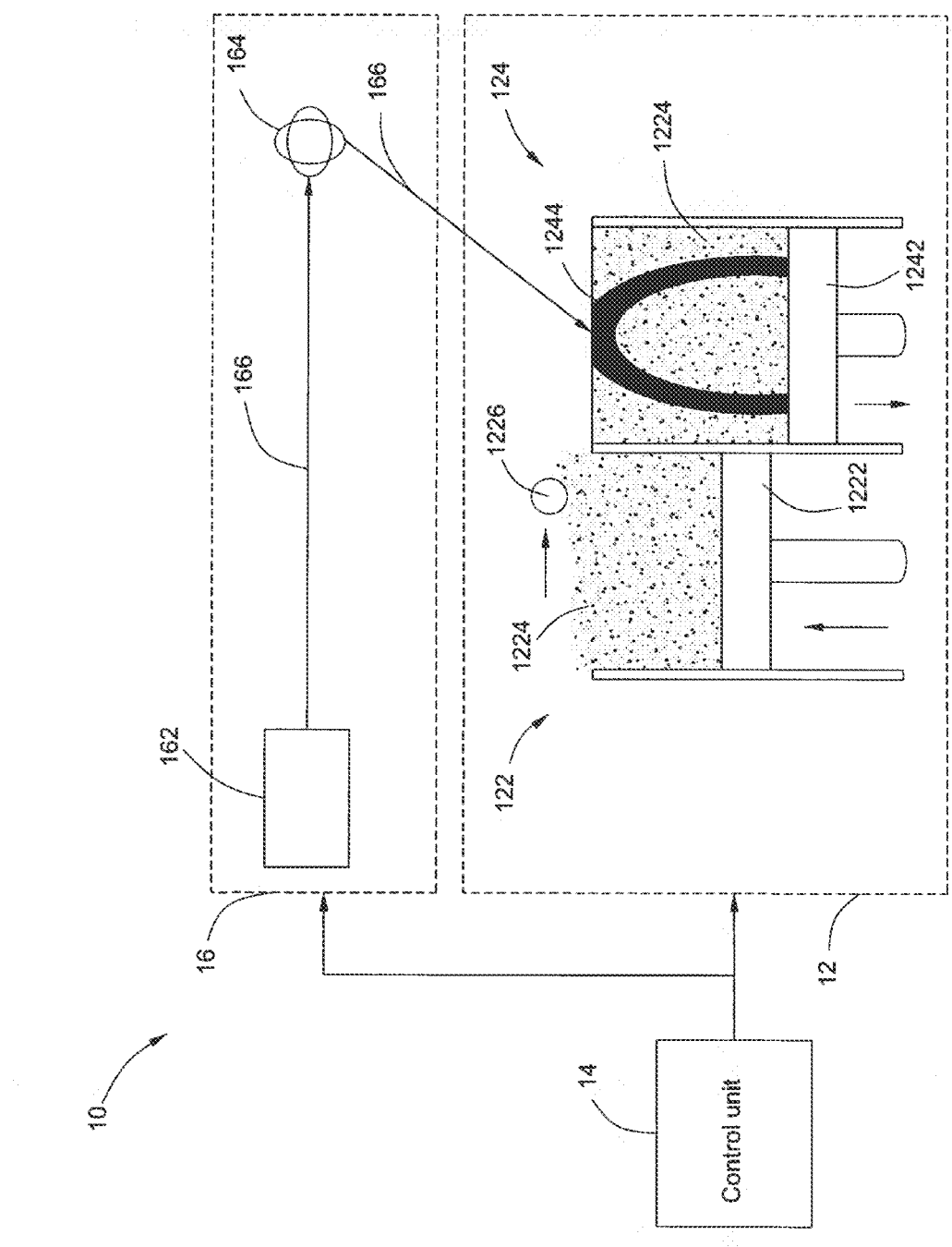
FIG. 1 is a schematic view of an exemplary laser rapid manufacturing device for rapid manufacturing an object.

Embodiments of the invention relate to a method for manufacturing a high melting point metal based object. The method includes: providing pure high melting point metal based powder; fabricating a green object from the powder, by way of a laser sintering technique; providing infiltration treatment to the green object; and providing heating pressure treatment to the green object. The temperature to the green object is controlled to the re-sintering point of the green object.

Embodiments of the present disclosure will be described with reference to the accompanying drawings. In the subsequent description, well-known functions or constructions are not described in detail to avoid obscuring the disclosure in unnecessary detail. Furthermore, the term "high melting metal based objects" refers to a type of objects which is made of high melting metal material, for example the object may be made of pure tungsten, or is made of high melting metal material balanced with binders and the high melting point metal is greater than 50 vol %. For example the object may be made of tungsten and balanced with nickel. The term "pure" refers to a type of high melting metal material with less than 1% impurity, for example 99.0% tungsten; in an embodiment, the level of impurity is less than or equal to 0.1%, for example, 99.9% tungsten.

Approximating language, as used herein throughout the specification and claims, may be applied to modify any quantitative representation that could permissibly vary without resulting in a change in the basic function to which it is related. Accordingly, a value modified by a term or terms, such as "about," is not to be limited to the precise value specified. In certain embodiments, the term "about" means plus or minus ten percent (10%) of a value. For example, "about 100" would refer to any number between 90 and 110. Additionally, when using an expression of "about a first value—a second value," the about is intended to modify both values. In some instances, the approximating language may correspond to the precision of an instrument for measuring the value or values.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, more particularly from 20 to 80, more particularly from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless defined otherwise, technical and scientific terms used herein have the same meaning as is commonly understood by one of ordinary skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items, and terms such as "front", "back", "bottom", and/or "top", unless otherwise noted, are merely used for convenience of description, and are not limited to any one position or spatial orientation. Moreover, the terms "coupled" and "connected" are not intended to distinguish between a direct or indirect coupling/connection between two components. Rather, such components may be directly or indirectly coupled/connected unless otherwise indicated.

Referring to FIG. 1, an exemplary laser rapid manufacturing device 10 for rapid manufacturing objects such as 3D objects is shown. As an example, the laser rapid manufacturing device 10 is a selective laser sintering/melting device. The laser rapid manufacturing device 10 mainly includes a fabrication bed 12, a control unit 14, and a laser scanning unit 16. Similar configurations may be used. The fabrication bed 12 may include a powder delivery unit 122 and a fabrication unit 124. The powder delivery system 122 may include a powder delivery platform 1222, powder 1224 located on the powder delivery platform 1222, and a roller 1226 used to push the powder 1224 into the fabrication unit 124. The fabrication unit 124 may include a fabrication platform 1242 used to receive the power 1224 delivered by the powder delivery unit 122. The laser scanning unit 16 may include a laser 162 and a scanner mirror 164. The laser 162 is used to generate a laser beam 166, and then the laser beam 166 is deflected by the scanner mirror 164 to selective laser sinter/melt the powder 1224 which is located on the fabrication platform 1242 layer by layer to form a green 3D object 1244 according to the control commands from the control unit 14. The term "green" refers to one or more intermediate states of the object 1244, prior to its completed state as will be described hereafter.

Figure 2:
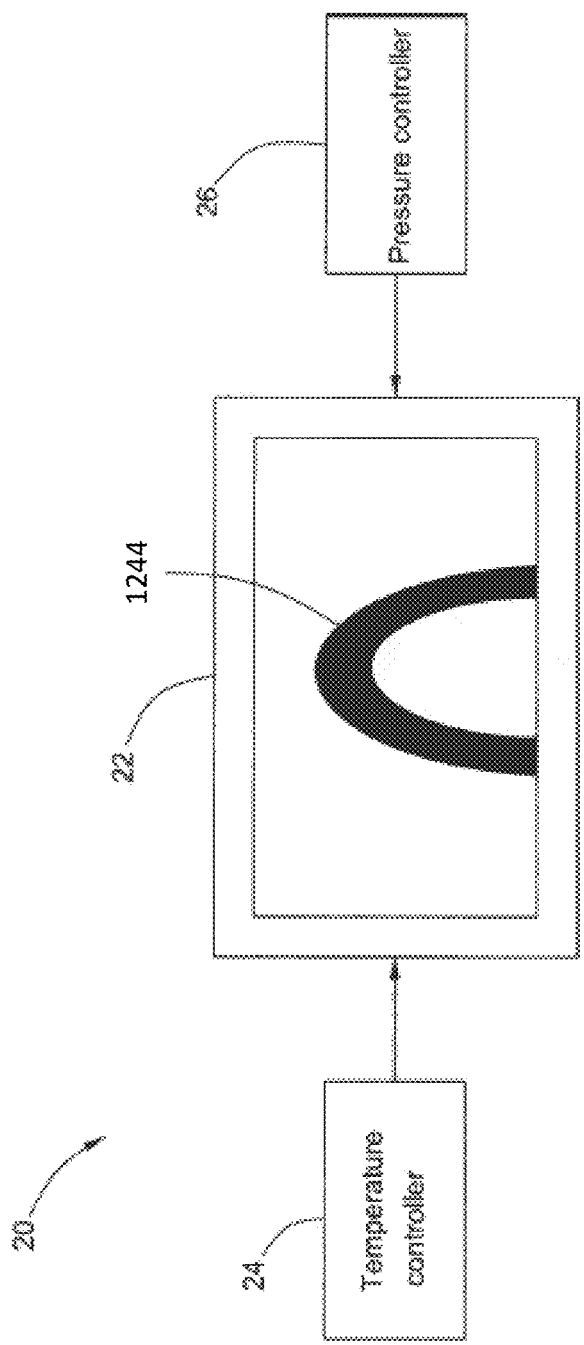
FIG. 2 is a schematic view of an exemplary heating pressure device for providing heating pressure treatment to a green object manufactured by laser rapid manufacturing technology, according to one embodiment.

Referring to FIG. 2, after the green object 1244 is formed by the laser rapid manufacturing device 10, the green object 1244 is further positioned in a heating pressure device such as an oven 20. The oven 20 may then be used to further treat the green object 1244, to improve its mechanical properties. In one embodiment, the oven 20 may include an oven case 22, a temperature controller 24, and a pressure controller 26. The oven case 22 is used to contain the green object 1244 to be treated. The temperature controller 24 is used to control temperature in the oven case 22. The pressure controller 26 is used to control pressure in the oven case 22. After the heating pressure treatment by the oven 20, a completed object 1244 is finished according to needs.

Figure 3:
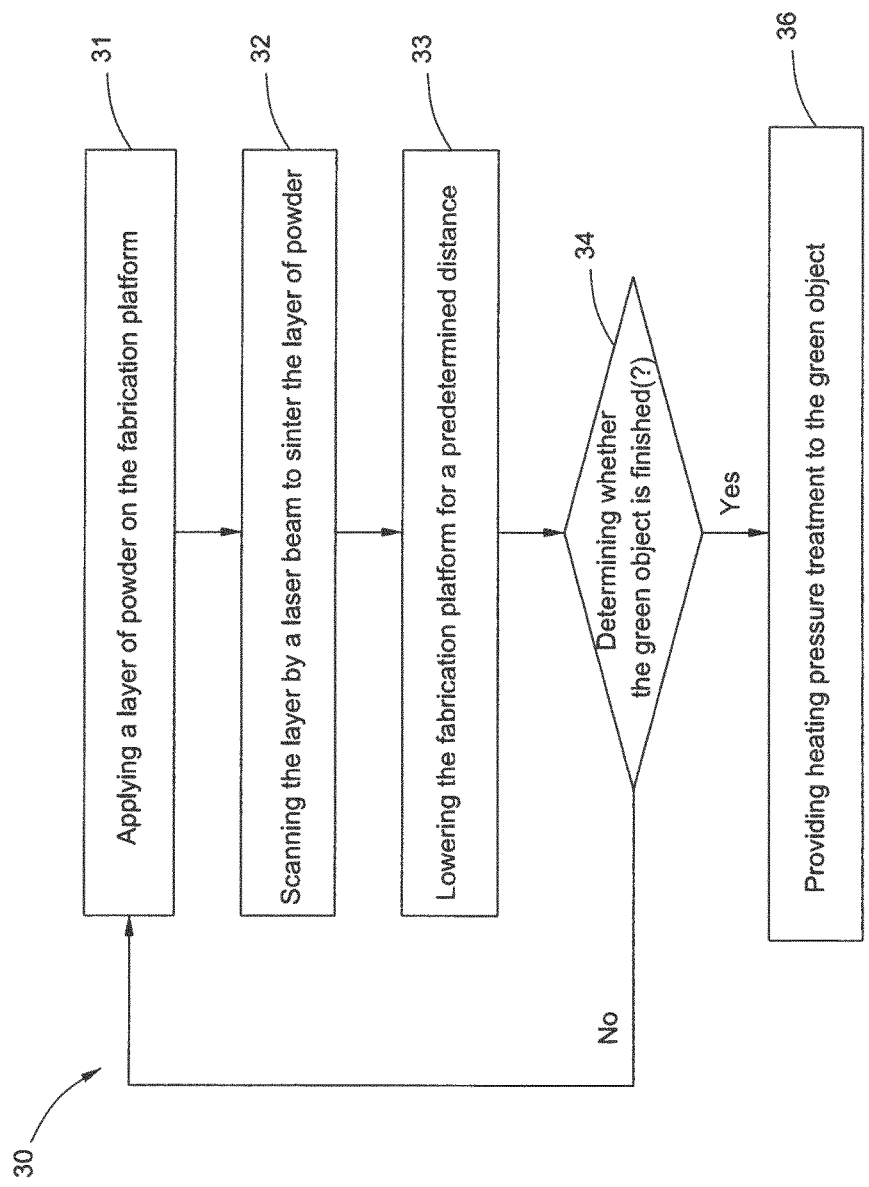
FIG. 3 is a flowchart of manufacturing a 3D object, according to one embodiment.

Referring to FIG. 3 together with FIGS. 1 and 2, a flowchart 30 of manufacturing the 3D object 1244 is shown. The manufacturing process typically includes the following steps.

Step (31): applying a thin layer of the powder 1224 on the fabrication platform 1242. As shown in FIG. 1, the control unit 14 controls the powder delivery platform 1222 move up a predetermined distance along the shown arrow direction according to control commands from the control unit 14. And then, the control unit 14 controls the roller 1226 to push the powder 1224 onto the fabrication platform 1242 of the fabrication unit 124. The thickness of thin layer may be controlled from 2060 microns in one embodiment.

Step (32): scanning the layer by the laser beam 166 to selective sinter/melt the layer of the powder 1224. As shown, the control unit 14 controls the laser scanning unit 16 to scan across and selectively sinter/melt the powder 1224 on the fabrication platform 1242 to build up a corresponding layer of a prototype from a predetermined model of the 3D object 1244. The scanning speed may be controlled from about 100 mm/s to about 500 mm/s. The laser power of the laser beam 166 may be controlled from 50-400 W. The predetermined model is prestored in a memory of the control unit 14.

Step (33): lowering the fabrication platform 1242 for a predetermined distance. As shown, the control unit 14 controls the fabrication platform 1242 in moving down a predetermined distance along the shown arrow direction according to control commands from the control unit 14.

Step (34): determining whether the green object 1244 is finished/completed. In certain embodiments, the process continues to step (35). In other embodiments, the process may be repeated, with step (31) until the green object 1244 is finished. The control unit 14 determines whether all of layers of the powder 1224 are applied according to predetermined manufacturing program stored in the control unit 14 in advance. In certain embodiments, the above manufacturing processes of the green object 1244 may be subjected to a laser sintering process. In still other embodiments, the manufacturing processes of the green object 1244 may be subjected to other suitable laser sintering processes.

Figure 5:
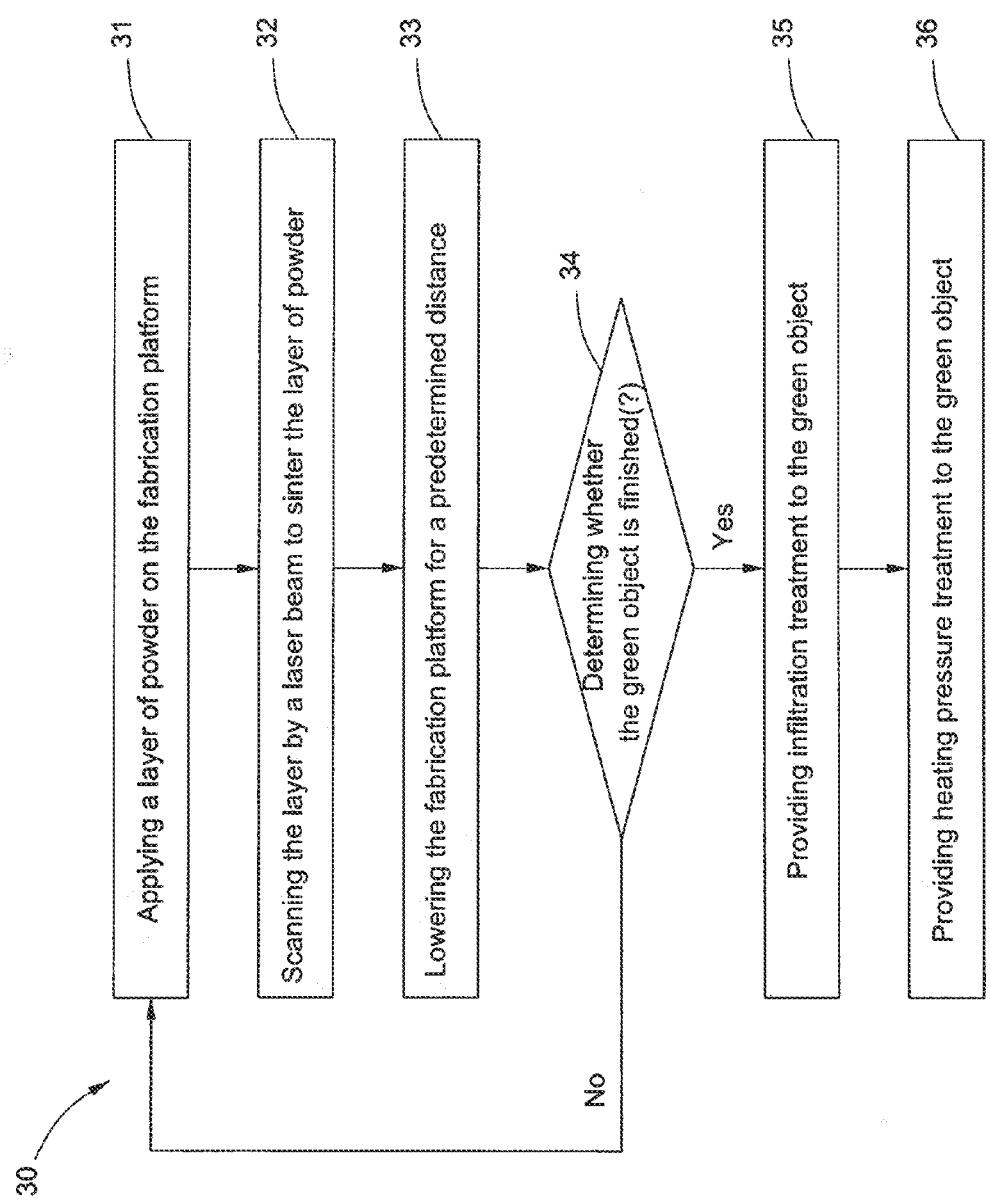
FIG. 5 is a flowchart of manufacturing a 3D object, according to another embodiment.

Step (36): providing heating pressure treatment to the green object 1244 under a predetermined condition. These above steps are also illustrated in FIG. 5.

Figure 4:
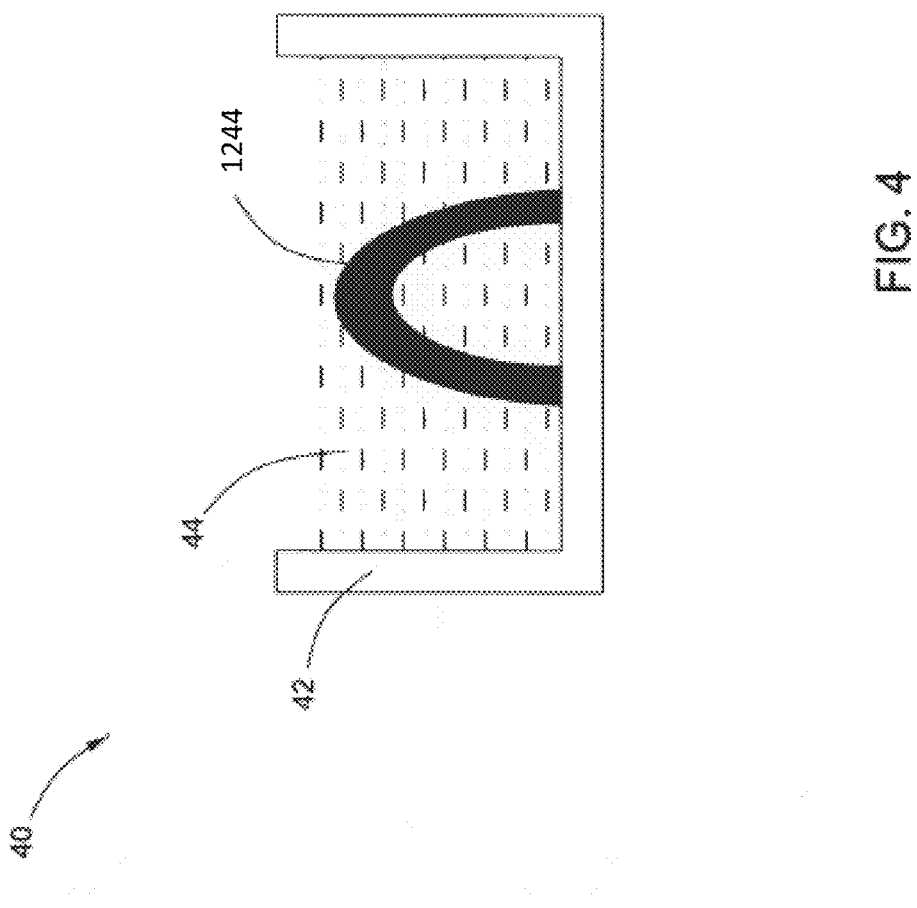
FIG. 4 is a schematic view of an exemplary infiltration device for providing infiltration treatment to a green object manufactured by laser rapid manufacturing technology, according to one embodiment.

Referring to FIG. 4, after the green object 1244 is formed by the laser rapid manufacturing device 10, the green object 1244 may be further positioned in an infiltration/penetration device 40. The infiltration device 40 may be used to further treat the green object 1244, to improve its mechanical properties, and then the green object 1244 is treated by the oven 20 as described above. In one embodiment, the infiltration device 40 may include a container 42 used to contain infiltration solution 44, such as Cu solution or Ni solution and the Cu or Ni is completely dissolved. During the infiltration process, illustrated as step (35) in FIG. 5, the green object 1244 is positioned in the container 42, and the infiltration solution 44 is added into the container 42 until it excesses the highest point of the green object 1244. After the infiltration treatment, the green object 1244 is returned to the oven 22 for further heating pressure treatment through the step (36). After the infiltration treatment and heating pressure treatment, a completed object 1244 may be finished according to needs. The FIG. 4 illustrates the infiltration device 40. In other embodiments, other control devices may be used, including but not limited to vacuum-pressureless control. In general, the high melting point metal balanced with low melting point metal binder is subjected to the method illustrated in FIG. 3 without the infiltration treatment step (35). A pure high melting point metal is often used by the method of FIG. 5 with the infiltration treatment step (35).

In one embodiment, the manufacturing process may be used to fabricate a collimator used in a medical imaging device. The situation when recording an x-ray image of a patient 3 in x-ray diagnosis is represented schematically in FIG. 6. The patient 3 lies between the tube focus 1 of an x-ray tube, which may be regarded as an approximately point x-ray source, and a detector surface 7. The x-rays 2 emitted from the focus 1 of the x-ray source propagate in a straight line in the direction of the x-ray detector 7, and in doing so pass through the patient 3. The primary beams 2a striking the detector surface 7, which pass through the patient 3 on a straight line starting from the x-ray focus 1, cause, on the detector surface 7, a positionally resolved attenuation value distribution for the patient 3. Some of the x-ray beams 2 emitted from the x-ray focus 1 are scattered in the patient 3. The scattered beams 2b created in this case do not contribute to the desired image information and, when they strike the detector 7, they significantly impair the signal-to-noise ratio. In order to improve the image quality, a collimator (or collimator array, or 2D collimator) 4 is therefore arranged in front of the detector 7.

Figure 6:
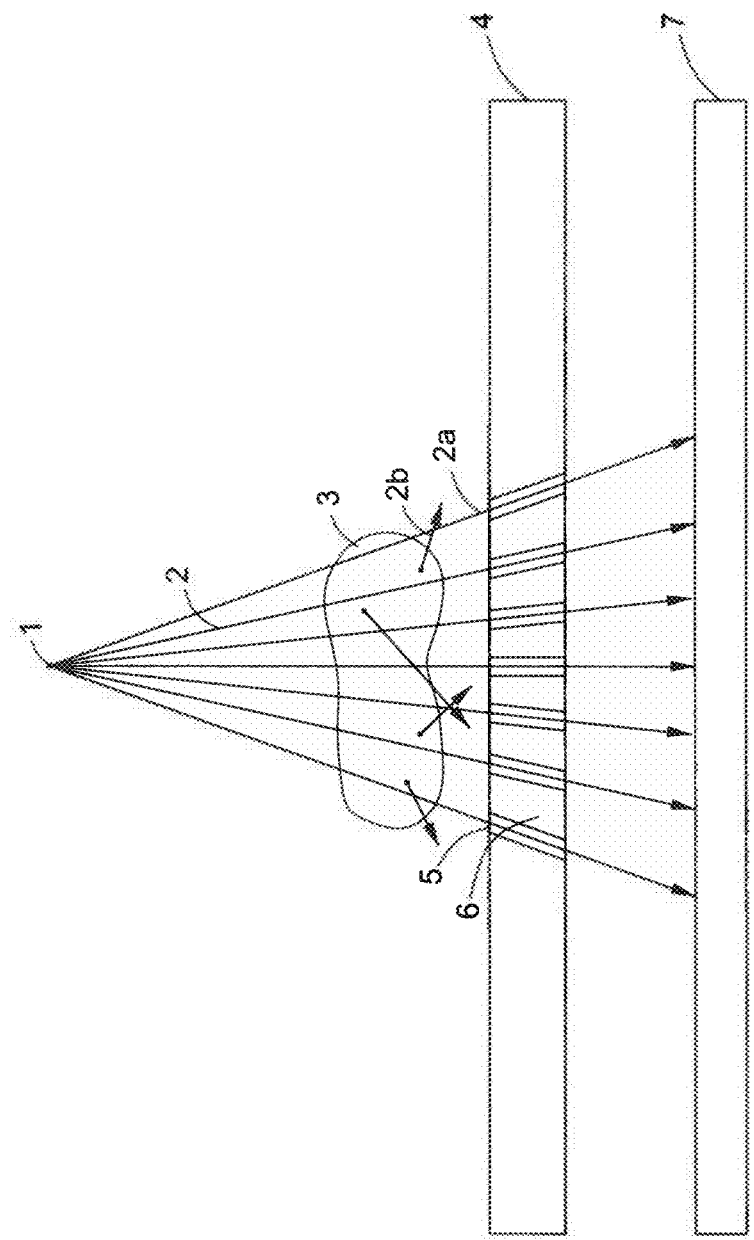
FIG. 6 is a schematic diagram of a patient in x-ray diagnosis by using a conventional medical imaging device including a collimator.
Figure 7:
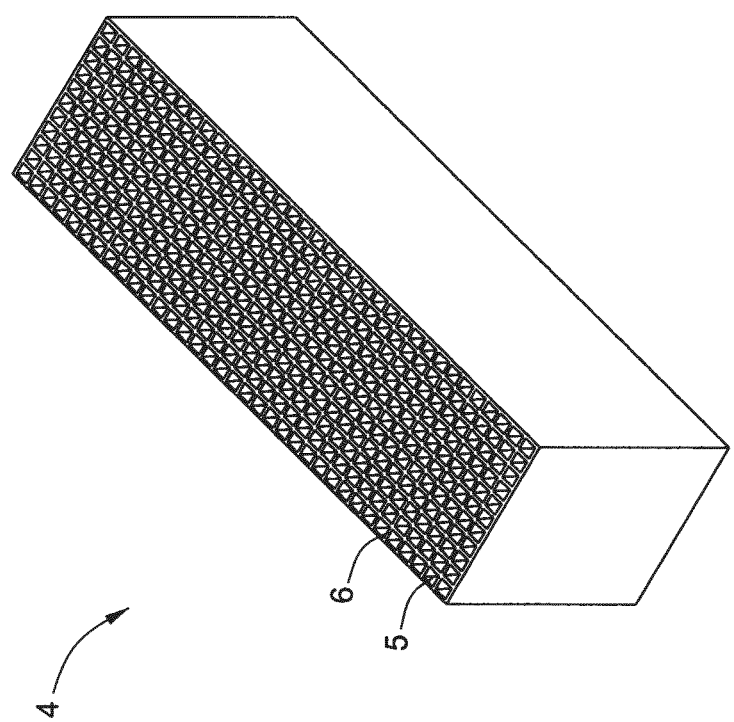
FIG. 7 is a schematic diagram of the collimator of FIG. 6.

With reference to FIGS. 6 and 7, the collimator 4 includes transmission channels 5 and absorbing regions 6 forming a grid arrangement. The transmission channels 5 are aligned in the direction of the tube focus 1, so that they allow the incident primary radiation 2a on a straight-line path to strike the detector surface 7. Beams not incident in this direction, in particular the scattered beams 2b, are blocked or significantly attenuated by the absorbing regions 6.

Collimators usually need to be made from high melting point and high density metals or alloys such as molybdenum, tungsten, tantalum, lead or their alloys, which have a high absorption capacity for X-ray and gamma radiation. Moreover, usually there are specific geometry requirements for collimators. For example, the collimator walls may be required to have very small thicknesses. With such material and geometric requirements, it is very difficult to manufacture collimators by conventional laser sintering process. For example, the green object 1244 fabricated by the steps (31) to (34) may not satisfy the requirement of the high melting point metal based objects, like the collimators 4.

For achieving a high melting point metal based object, having the geometric requirements needed, the above heating pressure treatment process, namely the step (36), may be used to further treat the green object 1244. In addition, quality may be further improved before the heating pressure treatment process, by using an infiltration treatment process. For example, a collimator may be made by the method shown in FIG. 3 and FIG. 5 from a metal powder that may include pure tungsten (W) or include tungsten balanced with nickel (Ni). In the tungsten and nickel mixture, the tungsten functions as a radiation-absorbing metal and the nickel functions as a binder, and the proportion of the tungsten is greater than 50 vol % to ensure radiation absorbing ability of the collimator. In other embodiments, other high melting point metals, such as molybdenum, tantalum, or their alloys may be used in place of tungsten, and other low melting point metal binders, such as Ti, Cu, Pb, Fe, may be used in place of nickel.

Figure 8:
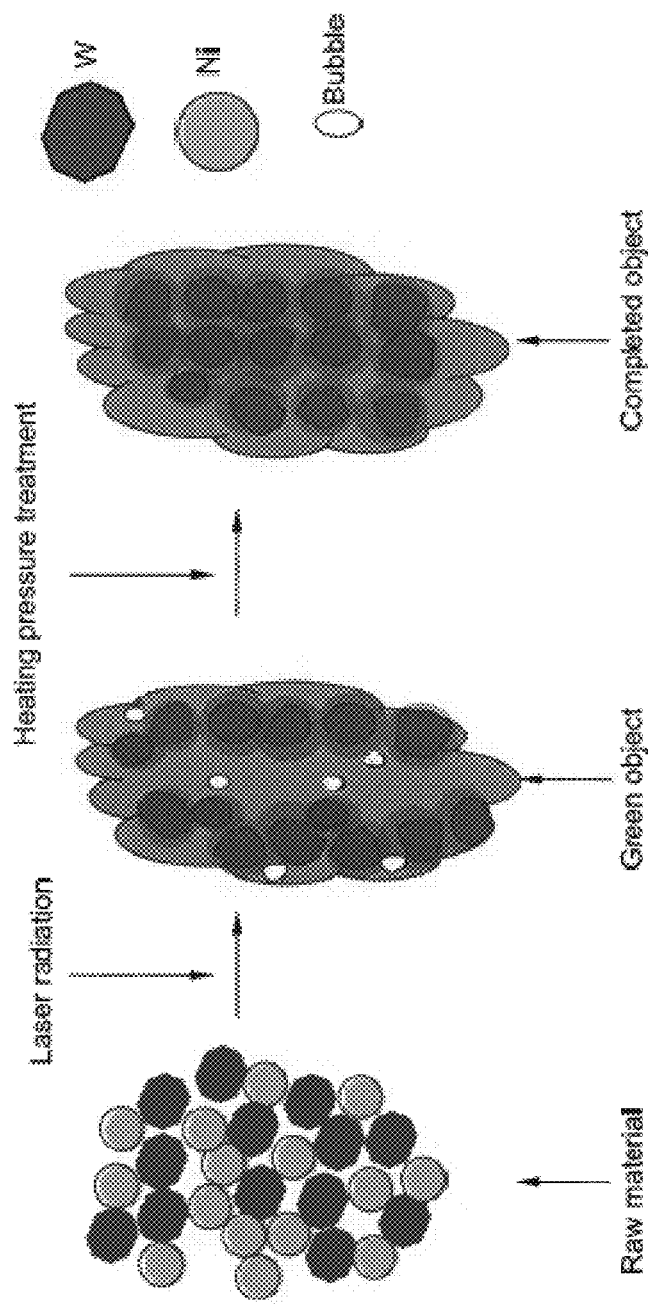
FIG. 8 is a schematic diagram illustrating a process for laser printing and heating pressure treating a tungsten and nickel powder mixture.

As illustrated in FIG. 8, in an embodiment where the metal powder is provided in a form of W—Ni powder mixture, the nickel powder, after absorbing the laser energy, can be completely melted as a binding phase at least partially surrounding the un-melted/partially melted tungsten powder due to the melting point of the tungsten powder is higher than temperature of the laser melting pool. The tungsten powder adjacent to the melted nickel is partially dissolved into the melted nickel to form W—Ni compound. Furthermore, the tungsten particles are not arranged uniformly in the W—Ni compound because the laser energy is not uniform and thus the flow dynamic in the laser melting pool is uneven. However, after the heating pressure treatment by the step (36) mentioned above in FIG. 3, the green object is reheated to the re-sintering, point, and pressured to reorganize the element distribution in the laser printed part to make sure the tungsten particle distribution is uniform in the W—Ni compound. Furthermore, the heating pressure treatment process also enhances the mechanical strength and increases the density to the completed object.

In an embodiment, the green object is a collimator; said collimator is made of tungsten and balanced with nickel, the thickness of the collimator is about 0.1-0.2 mm, and the tungsten and nickel mixture may have various particle sizes ranging from about 5-50 microns. Said collimator (green object) may be treated by a heating pressure process where temperature is controlled between 1000-1300 degrees Celsius and pressure is controlled above 100 MPa, for about 2-4 hours. In other embodiments, the manufacturing process also can fabricate other objects which at least have a thin part which ranging from about between 0.1-0.5 mm. In other embodiments, the metal powder may be provided in the form of tungsten powder coated with nickel, or other forms.

Figure 9:
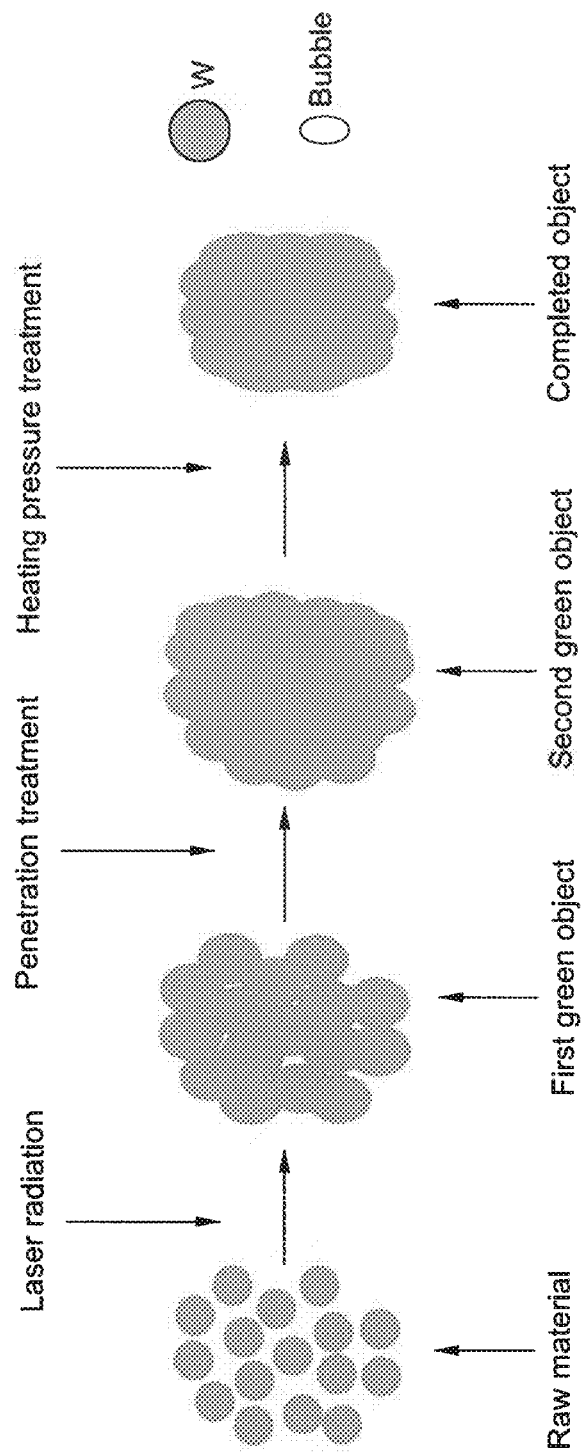
FIG. 9 is a schematic diagram illustrating a process for laser printing, infiltration treating, and heating pressure treating pure tungsten powder.

As illustrated in FIG. 9, in an embodiment where the metal powder is provided in a form of pure tungsten powder, after absorbing the laser energy, the pure tungsten powder cannot be completely melted because the melting point is very high. Therefore, the tungsten particles cannot completely dissolve together which results in a compromising of the mechanical strength of the melted tungsten structure. However, after the infiltration treatment, such as that shown instep (35), and the heating pressure treatment by the step (36) mentioned above in FIG. 5, the first green object at the step (35) is infiltrated by the metal solution 44, and then the second green object at the step (36) is reheated to the re-sintering point Additionally, with the application of pressure, the tungsten particles may be dissolved together with the metal from the metal solution 44. Thus, the infiltration treatment and the heating pressure treatment processes enhance the mechanical strength, and increases density of the completed object. Further, by using the heating pressure treatment process and the infiltration treatment process, the laser power in the laser sintering process can be reduced. This may reduce cost.

In an embodiment, the green object is a collimator; said collimator is made of pure tungsten, the thickness of the collimator is about between 0.1-0.2 mm, and the tungsten may have various particle sizes ranging from about 5-50 microns. Said collimator (green object) may be treated by a heating pressure process where temperature is controlled between 2300-3000 degrees Celsius and pressure is controlled above 100 MPa, for about 2-4 hours. "Particle size" as used herein, equals the diameter of the sphere that has the same volume as a given particle. In other embodiments, the manufacturing process also can fabricate other objects which at least have a thin part which ranging from about between 0.1-0.5 mm.

After finishing the collimator object, post processing may be applied to the collimator object. The applicable post processing may include, but is not limited to sandblasting, mechanical polishing, abrasive flowing machining, magnetic polishing, electric chemical machining and chemical etching.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments flailing within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

What is claimed is:

1. A method for manufacturing a high melting point metal based object, the method comprising:
   providing a powder consisting of only a pure, high melting point metal;
   fabricating a green object from the powder consisting of only the pure, high melting point metal, by way of partially melting the powder using a laser sintering technique;
   after fabricating the green object, providing an infiltration treatment to the green object by positioning the green object in a container and adding a metal solution to the container; and
   after providing the infiltration treatment, positioning the infiltrated green object in a heating pressure device to provide a heating pressure treatment to the infiltrated green object, wherein a temperature applied to the infiltrated green object is controlled to a re-sintering point of the green object, and wherein a pressure of the heating pressure treatment combines the infiltrated green object having partially melted powder with completely dissolved metal in the metal solution.

2. The method of claim 1, wherein the metal solution comprises a Cu or Ni solution, wherein the Cu or Ni is completely dissolved in the metal solution.

3. The method of claim 1, wherein the powder consists of pure tungsten.

4. The method of claim 3, wherein the high melting point metal based object comprises a fabricated section having a thickness ranging from about 0.1 mm to about 0.5 mm.

5. The method of claim 4, wherein the high melting point metal based object comprises a collimator.

6. The method of claim 5, wherein a thickness of the collimator is about 0.1 mm to about 0.2 mm.

7. The method of claim 6, wherein providing the heating pressure treatment comprises:
   providing the heating pressure treatment to the infiltrated green object at a temperature between 2300-3000 degrees Celsius, and at a pressure above 100 MPa.

8. The method of claim 7, wherein the heating pressure device is an oven comprising a temperature and pressure control.

9. The method of claim 1, wherein fabricating comprises:
   a. applying a layer of the powder on a fabrication platform;
   b. scanning the layer by a laser beam to sinter the layer of powder;
   c. lowering the fabrication platform for a predetermined distance; and
   d. optionally repeating steps a) to c).

* * * * *